United States Patent
Alexander

[11] Patent Number: 5,912,627
[45] Date of Patent: Jun. 15, 1999

[54] DEVICE AND METHOD FOR INDICATING IF AN AIRPLANE IS OPERATING WITHIN OPERATING LIMITS

[76] Inventor: William J. Alexander, 1262 Montclair Dr., Pittsburgh, Pa. 15241

[21] Appl. No.: 08/953,281

[22] Filed: Oct. 17, 1997

[51] Int. Cl.$^6$ ................................................ G08B 5/00
[52] U.S. Cl. ............... 340/815.4; 340/945; 340/966; 340/969; 340/978; 701/7; 701/8; 701/14; 701/9; 116/DIG. 43
[58] Field of Search ............................ 340/815.4, 945, 340/966, 969, 971, 978, 439; 244/181, 182; 701/7, 8, 14, 35, 5, 6, 9, 4; 116/280, DIG. 43; 364/928.1

[56] References Cited

U.S. PATENT DOCUMENTS

| | | | |
|---|---|---|---|
| 3,132,323 | 5/1964 | Hauptman | 340/969 |
| 3,271,542 | 9/1966 | Hradek | 200/81.5 |
| 3,496,534 | 2/1970 | Anderson | 340/969 |
| 4,297,673 | 10/1981 | Green | 340/946 |
| 4,312,041 | 1/1982 | DeJonge | 701/123 |
| 4,463,355 | 7/1984 | Schultz | 340/971 |
| 4,583,094 | 4/1986 | Mosier | 340/975 |
| 4,590,475 | 5/1986 | Brown | 340/966 |
| 4,604,711 | 8/1986 | Benn et al. | 701/14 |
| 4,663,627 | 5/1987 | Dennis | 340/975 |
| 5,003,305 | 3/1991 | Kelly et al. | 340/974 |
| 5,134,394 | 7/1992 | Beadle | 340/975 |
| 5,209,139 | 5/1993 | Austin | 340/462 |
| 5,248,968 | 9/1993 | Kelly | 340/961 |
| 5,250,947 | 10/1993 | Worden | 340/973 |
| 5,359,326 | 10/1994 | Bivens | 340/971 |
| 5,367,460 | 11/1994 | Fabre | 701/14 |
| 5,412,382 | 5/1995 | Leard | 340/974 |
| 5,420,582 | 5/1995 | Kubbat | 340/974 |
| 5,479,346 | 12/1995 | Lecomte | 701/14 |

OTHER PUBLICATIONS

Hiscocks, D., "All About Loads," EAA Experimenter, 39–41 (1995).

*Primary Examiner*—Benjamin C. Lee
*Attorney, Agent, or Firm*—Bartony Hare & Edson

[57] ABSTRACT

The present invention provides a device for indicating an operating point of an aircraft comprising a sensor to measure air speed and a sensor to measure vertical acceleration. The device also comprises a processor in communicative connection with each of the airspeed sensor and the vertical acceleration sensor. The processor is also in communicative connection with a display. The display presents an operating envelope diagram of the aircraft. The display also displays the current operating point of the aircraft relative to the operating envelope diagram. The present invention also provides a method for indicating an operating point of an aircraft in which the operating envelope diagram and the measured operating point of the aircraft are displayed upon the same display.

18 Claims, 4 Drawing Sheets

DEVICE AND METHOD FOR INDICATING IF AN AIRPLANE IS OPERATING WITHIN OPERATING LIMITS

FIELD OF THE INVENTION

The present invention relates to a device and a method for indicating if an airplane is operating within operating limits, and particularly, to a device and a method which displays such information to the pilot in a substantially direct manner.

BACKGROUND OF THE INVENTION

Aircraft in flight are constrained to operate within certain parameters. For example, there is an airspeed which must never be exceeded, usually called $V_{ne}$. There is also an airspeed which must not be exceeded except in smooth air, usually called maneuvering speed. Further, there is an airspeed (which is a function of dynamic wing loading) below which the wing stalls and the airplane falls. These airspeeds are presently indicated by colored markings on the airspeed indicator and on placards within the airplane. The pilot is responsible for observing these limitations throughout the operation of the airplane. In particular, the pilot must estimate, without direct indication, the possibility that the airspeed may be near stall or structural damage.

Similarly, the airplane is subject to vertical acceleration forces resulting from climbing, descent, and turbulence. The pilot is required to keep these forces below levels which will cause structural damage. This result is accomplished by restraint in manipulation of the controls above maneuvering speed and by allowing the wing to stall below maneuvering speed. It is important to note that stalling is an undesirable event, but it is preferable to structural damage. A small number of aircraft are equipped with accelerometers to indicate the level of these forces, but normally pilots receive no quantified indication of acceleration.

At present there is no operational tool for indicating the operating point of the airplane in flight with respect to the operational limits, or the "envelope", of airspeed and vertical acceleration. In many cases, the instruments operate independently, leaving it to the pilot's judgment to relate these parameters. In other cases, the parameters may be measured and related by the instruments, but the display of information to the pilot is insufficiently related to the maneuver envelope. See, for example, U.S. Pat. Nos. 5,359,326 and 4,590,475.

It is, therefore, very desirable to develop devices and methods which indicate to a pilot of an aircraft where the operating point of the aircraft is in relation to the aircraft's operating limits.

SUMMARY OF THE INVENTION

The present invention measures both airspeed and vertical acceleration at a particular instant and graphically plots these data in a format easily understood by the pilot. The graphical display makes apparent the operating point of the airplane and its proximity to an unsafe condition. Moreover, the invention provides the potential to alarm the pilot if the operating point of the airplane is approaching the operating limits of the airplane.

In general, the present invention provides a device for indicating an operating point of an aircraft comprising:

a. a sensor to measure air speed;

b. a sensor to measure vertical acceleration;

c. a processor in communicative connection with the airspeed sensor and the vertical acceleration sensor; and d. a display in communicative connection with the processor, the display displaying an operating envelope diagram for the aircraft, the display also displaying the current operating point of the aircraft relative to the operating envelope diagram.

Preferably the display comprises a first axis corresponding to airspeed, expressed in any convenient units of measure, and a second axis corresponding to vertical acceleration or wing loading, expressed as a multiple of the gravitational constant. Preferably, the first axis is horizontal and the second axis is vertical. The envelope diagram for the aircraft (that is, the calculated or predetermined operational limits of the aircraft with respect to airspeed and vertical acceleration) is displayed relative to the first and second axes. The current operating point of the aircraft (that is, a point representing the current measured airspeed and the current measured vertical acceleration) is also displayed relative to the first axis and the second axis, thereby providing an indication of where the operating point of the airplane is relative to the operating envelope diagram.

The present invention also provides a method for indicating an operating point of an aircraft. The method comprises the steps of:

a. measuring an air speed of the aircraft;

b. measuring a vertical acceleration of the aircraft;

c. displaying an operating envelope diagram for the aircraft; and d. displaying the measured airspeed and the measured vertical acceleration of the aircraft relative to the operating envelope diagram.

The present invention thus provides a practical, inexpensive and safe enhancement to aircraft operation by correlating, in a single display, information critical to the operation of the aircraft. Existing aircraft are easily retrofitted to incorporate the present invention, which significantly reduces a pilot's mental workload and provides a mechanism for reviewing pilot performance after a flight.

DETAILED DESCRIPTION OF THE INVENTION

Figure 1:
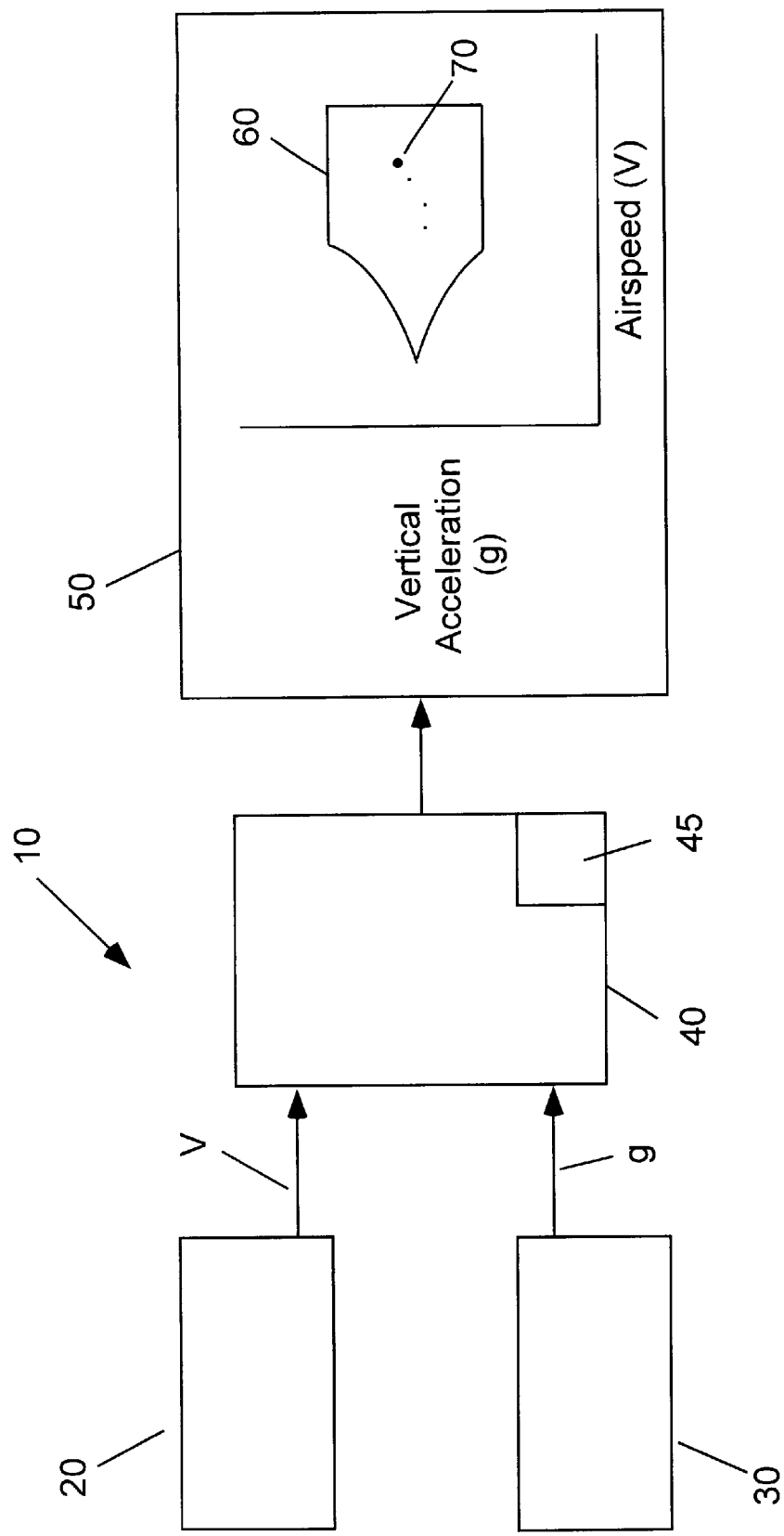
FIG. 1 illustrates a schematic diagram of one embodiment of the invention.

In the embodiment illustrated in FIG. 1, device 10 of the present invention comprises air speed sensor 20 such as a differential pressure transducer which may be connected to the airplane's existing pitot-static system. Device 10 also comprises a vertical acceleration sensor 30 such as a vertical acceleration transducer. A processor 40 (for example, a microprocessor) is in communicative connection with each of airspeed sensor 20 and vertical acceleration sensor 30. Processor 40 is also in communicative connection with a display 50 such as a CRT or a liquid crystalline display. Display 50 preferably displays an operating envelope diagram 60 of the aircraft. Display 50 also displays an operating point 70 (that is, the measured airspeed and vertical acceleration) of the airplane relative to operating envelope diagram 60.

Airspeed sensor 20 may, for example, comprise a silicon pressure transducer and associated circuitry (as known in the art) to provide an electrical signal proportional to the airspeed of the airplane to processor 40. Alternatively, other pressure transducers, such as an electromechanical bellows or a pressure gauge, may be used. The pressure transducer may be remote from or internal to display 50. In that regard, the pressure transducer may be located adjacent a pitot tube, which is generally mounted in a wing. A pitot tube is typically used to measure "ram" air pressure. In that embodiment, the pressure transducer operates to send an electrical signal to processor 40 via wiring. Alternatively, the pressure transducer can be located, for example, in close proximity to or within display 50, which is preferably mounted on the control panel of the plane (not shown). In that case, the pressure transducer could be connected to the pitot tube via appropriate plumbing.

Vertical acceleration sensor 30 may, for example, comprise a silicon accelerometer and associated circuitry (as known in the art) to provide an electrical signal proportional to the vertical loading of the airplane and wings to processor 40. Alternatively, other electromechanical accelerometers, such as mechanical or piezoelectric devices, may be used. As is the case with the airspeed sensor 20, vertical acceleration sensor 30 may be remote from or internal to display 50.

Figure 2:
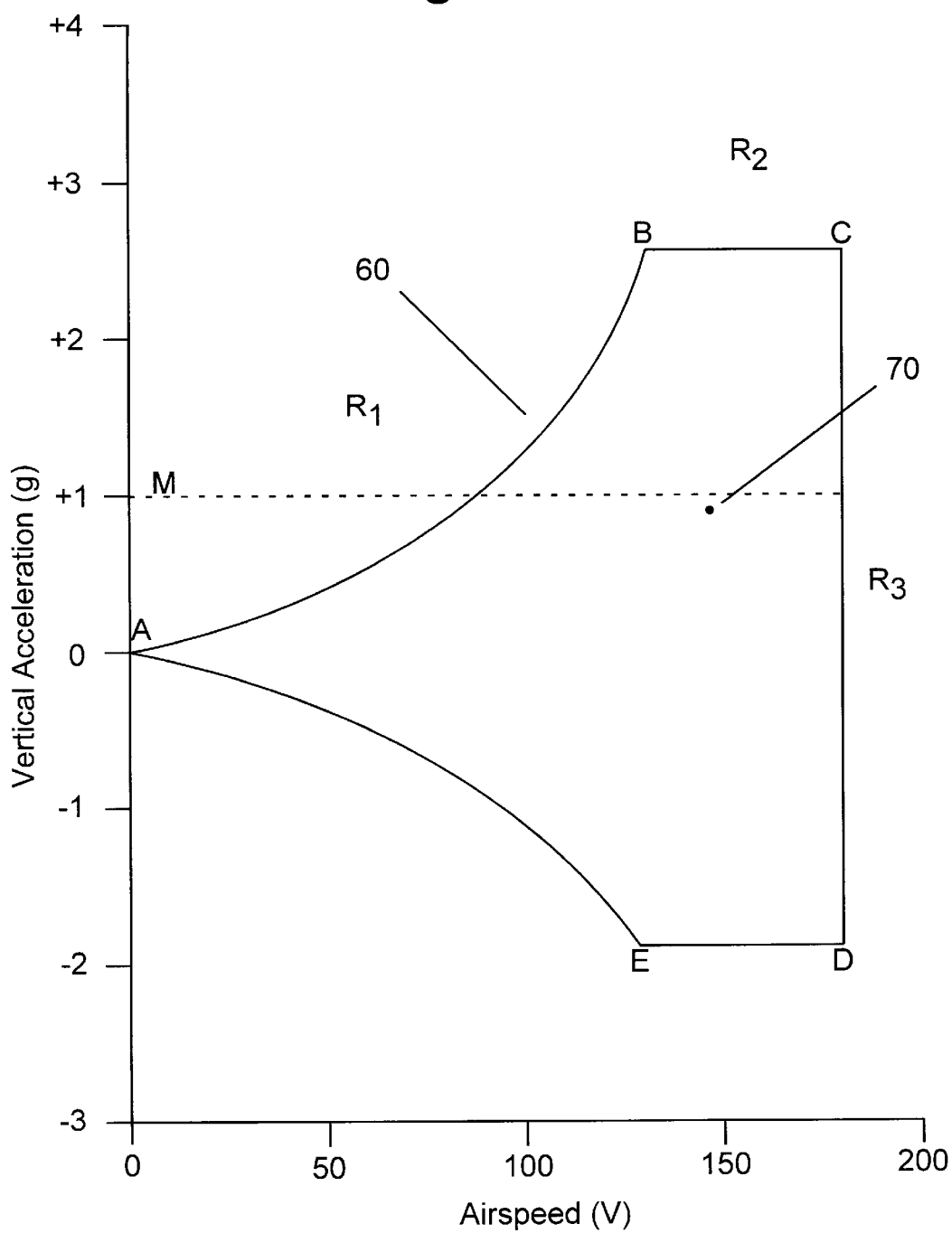
FIG. 2 illustrates a typical operating or maneuver envelope of an aircraft.

FIG. 2 provides an example of a diagram variously referred to as a V-N Diagram, a V-g Diagram, a maneuver envelope diagram or an operating envelope diagram 60. Although this drawing is usually made familiar to all pilots during pilot training to explain the constraints of airplane operation, no significant use is made of diagram 60 beyond pilot training and general discussions of aerodynamics.

In general, the horizontal axis of operating envelope diagram 60 is airspeed, expressed in any convenient units of measure. The vertical axis is vertical acceleration or wing loading, expressed as a multiple of the gravitational constant. At any instant in time, and airplane's operation may be plotted as a point on this graph corresponding to the correct airspeed and vertical acceleration.

The curve A-B on the graph represents the combinations of airspeed and loading beyond which the particular wing will stall, losing its ability to support the airplane. The region $R_1$ represents this stall area. The line B-C represents the maximum positive wing loading for which the airplane has been certified. Region $R_2$ represents an area of potential structural damage. The line C-D represents the maximum or "never exceed" airspeed. Region $R_3$ represents an area of potential airframe damage. Line D-E represents the maximum negative wing loading, with a corresponding region of potential damage. Finally, curve E-A represents an area of negative stalling, complementary to curve A-B. Dashed line M represents the value of +1 g, or gravity units. This is the ideal value corresponding to level flight in smooth air.

Figure 3:
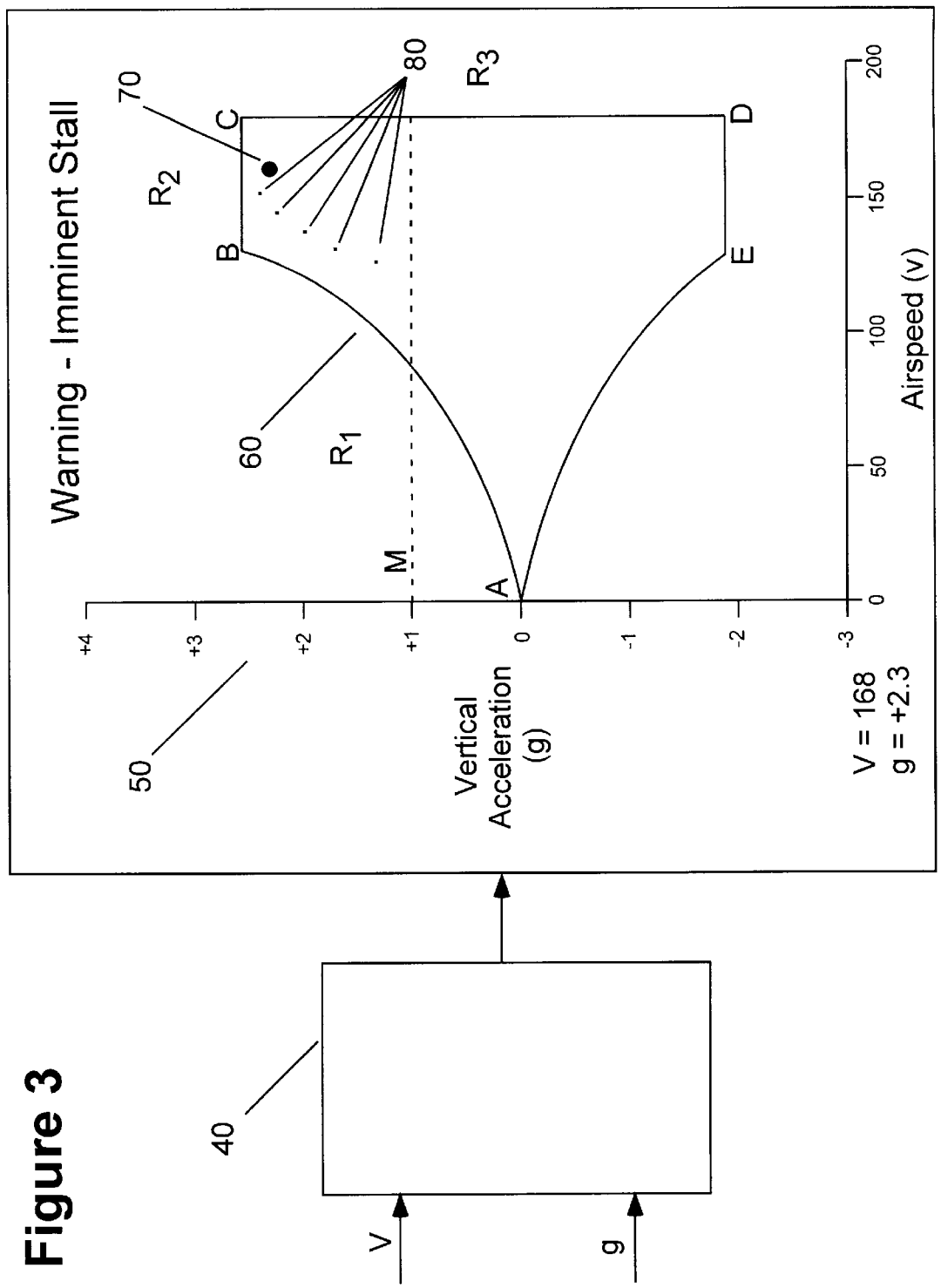
FIG. 3 illustrates an embodiment of a display of the present invention.

As illustrated in FIG. 3, processor 40 preferably receives electrical signals corresponding to the measured airspeed and vertical acceleration and plots the corresponding point on display 50. Display 50 also preferably simultaneously presents operating envelope diagram 60. The pilot can, by simply viewing display 50, determine if the airplane is operating within a safe region.

Figure 4:
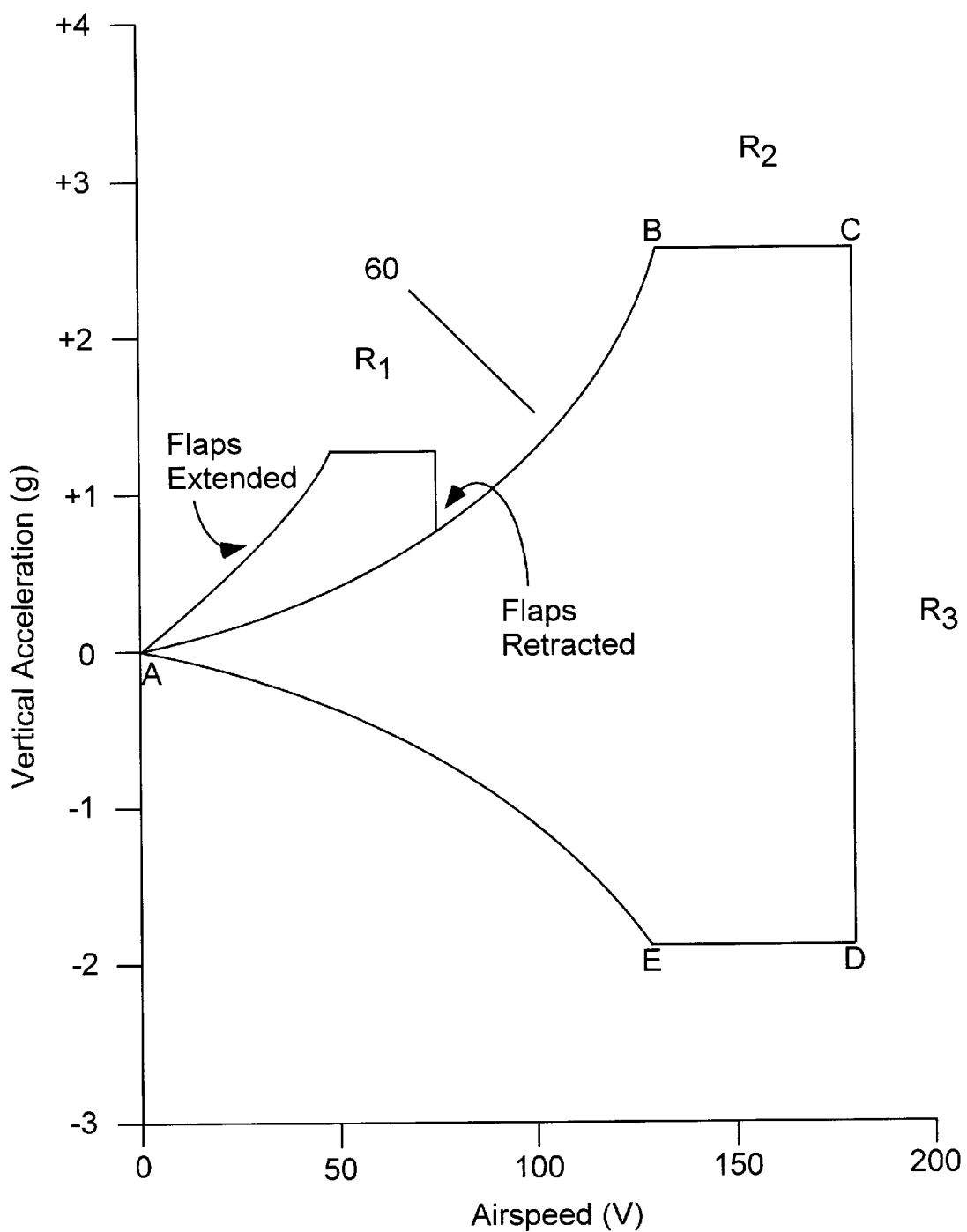
FIG. 4 illustrates another embodiment of a display of the present invention.

The extension of leading edge slats or trailing edge flaps (not shown) change the operating limitations of the wings. As shown in FIG. 4, an extension of the operating envelope diagram can indicate such modified limitations. These may appear continuously or be activated via an electrical signal when flaps or slats are in use.

As illustrated in FIG. 3, the addition of historical data points 80 can indicate to the pilot whether the trend in the operation of the airplane is toward a safer region or toward an unsafe region. If desired, processor 40 can easily be programmed to determine the proximity of the operating point to the limits of the unsafe regions and issue an audible and/or visual warning to the pilot to call his attention to that fact. Likewise, processor 40 can easily be programmed to provide a textual display of the airspeed and loading in addition to the graphical display. Further, processor 40 can easily be programmed to store data (for example, operating points of the aircraft measured at defined intervals of time) in a memory 45 in operative connection with processor 40 for later review. Such data would be extremely useful for determining the accurate execution of aerobatic maneuvers or for post-accident investigations.

Although the present invention has been described in detail in connection with the above examples, it is to be understood that such detail is solely for that purpose and that variations can be made by those skilled in the art without departing from the spirit of the invention except as it may be limited by the following claims.

What is claimed is:

1. A device for indicating an operating point of an aircraft, the device comprising:
   a. a sensor to measure air speed;
   b. a sensor to measure vertical acceleration;
   c. a processor in communicative connection with the airspeed sensor and the vertical acceleration sensor; and
   d. a display in communicative connection with the processor, the display displaying an operating envelope diagram for the aircraft, the display also displaying a measured airspeed and a measured vertical acceleration of the aircraft relative to the operating envelope diagram.

2. The device of claim 1 further comprising an alarm mechanism to provide a warning when the measured airspeed and the measured vertical acceleration are in the proximity of an unsafe region as defined by the operating envelop diagram.

3. The device of claim 1 wherein the display sets forth historical measured airspeeds and measured vertical accelerations as well as current measured airspeed and measured vertical acceleration to provide an indication of the change in measure airspeed and measured vertical acceleration over time.

4. The device of claim 1 wherein the processor is a microprocessor.

5. The device of claim 1 further comprising a memory in operative connection with the processor to store the measured airspeed and the measured vertical acceleration at defined intervals of time.

6. The device of claim 1 wherein the sensor to measure airspeed comprises a pressure transducer.

7. The device of claim 1 wherein the sensor to measure vertical acceleration comprises an accelerometer.

8. The device of claim 1 wherein the display sets forth a graph of the operating envelope diagram having a vertical axis corresponding to vertical acceleration and a horizontal axis corresponding to airspeed, the measured airspeed and the measured vertical acceleration of the aircraft being displayed relative to the vertical axis and the horizontal axis.

9. The device of claim 8 wherein the display also sets forth a textual display of measure airspeed and measure vertical acceleration.

10. A method for indicating an operating point of an aircraft, the method comprising the steps of:
   a. measuring an air speed of the aircraft;
   b. measuring a vertical acceleration of the aircraft;
   c. displaying an operating envelope diagram of the aircraft; and
   d. displaying the measured airspeed and the measured vertical acceleration of the aircraft relative to the operating envelope diagram.

11. The method of claim 10 further comprising the step of providing a warning when the measured airspeed and the measured vertical acceleration are in the proximity of an unsafe region as defined by the operating envelop diagram.

12. The method of claim 10 further comprising the step of displaying historical measured airspeeds and measured vertical accelerations as well as current measured airspeed and measured vertical acceleration to provide an indication of the change in measure airspeed and measured vertical acceleration over time.

13. The method of claim 10 wherein the processor is a microprocessor.

14. The method of claim 10 further comprising the step of storing the measured airspeed and the measured vertical acceleration at defined intervals of time in a memory in operative connection with the processor.

15. The method of claim 10 wherein the sensor to measure airspeed comprises a pressure transducer.

16. The method of claim 10 wherein the sensor to measure vertical acceleration comprises an accelerometer.

17. The method of claim 10 wherein the display sets forth a graph of the operating envelope diagram having a vertical axis corresponding to vertical acceleration and a horizontal axis corresponding to airspeed, the measured airspeed and the measured vertical acceleration of the aircraft being displayed relative to the vertical axis and the horizontal axis.

18. The method of claim 17 further comprising the step of displaying a textual display of measure airspeed and measure vertical acceleration.

* * * * *